United States Patent
Smith

(10) Patent No.: US 7,023,655 B2
(45) Date of Patent: Apr. 4, 2006

(54) FLUID GUIDE FOR A DATA STORAGE DEVICE

(75) Inventor: James Hart Smith, Woodside, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 287 days.

(21) Appl. No.: 10/395,758

(22) Filed: Mar. 24, 2003

(65) Prior Publication Data

US 2003/0202276 A1  Oct. 30, 2003

Related U.S. Application Data

(60) Provisional application No. 60/375,859, filed on Apr. 26, 2002.

(51) Int. Cl.
*G11B 33/14* (2006.01)
*G11B 17/04* (2006.01)

(52) U.S. Cl. .................................... 360/97.02; 720/648
(58) Field of Classification Search ............. 360/97.02, 360/97.03
See application file for complete search history.

(56) References Cited

U.S. PATENT DOCUMENTS

| | | | |
|---|---|---|---|
| 4,657,671 A * | 4/1987 | Botstiber et al. | 210/86 |
| 4,879,618 A | 11/1989 | Iida et al. | |
| 5,036,416 A | 7/1991 | Mastache | |
| 5,134,530 A | 7/1992 | Hall | |
| 5,696,649 A * | 12/1997 | Boutaghou | 360/97.03 |
| 5,907,453 A * | 5/1999 | Wood et al. | 360/97.02 |
| 6,097,568 A | 8/2000 | Ekhoff | |
| 6,266,208 B1 * | 7/2001 | Voights | 360/97.02 |
| 6,271,987 B1 | 8/2001 | Allsup et al. | |
| 6,337,782 B1 * | 1/2002 | Guerin et al. | 360/256.1 |
| 6,369,978 B1 * | 4/2002 | Shimizu et al. | 360/97.03 |
| 6,560,066 B1 * | 5/2003 | Imai et al. | 360/97.02 |
| 6,594,108 B1 * | 7/2003 | Naganathan et al. | 360/97.02 |
| 6,618,222 B1 * | 9/2003 | Watkins et al. | 360/97.02 |
| 6,876,514 B1 * | 4/2005 | Little | 360/97.02 |
| 2002/0015255 A1 | 2/2002 | Tade Palli et al. | |
| 2002/0036862 A1 | 3/2002 | Tsang et al. | |

* cited by examiner

*Primary Examiner*—Brian E. Miller
(74) *Attorney, Agent, or Firm*—Jennifer M. Buenzow

(57) ABSTRACT

A fluid guide for recirculating fluid through a filter in a data storage device, the data storage device having a disc rotatably supported on a base and operatively imparting a velocity to the fluid surrounding the disc resulting in a generally outwardly spiraling fluid flow. The fluid guide comprises a shroud supportable by the base substantially transversely to the disc comprising a distal surface closely matingly engageable with the disc edge, a vane extending from the shroud substantially parallel to the disc and opposing the base, the vane comprising a leading edge disposed transverse to the disc and within the fluid flow, guiding the fluid toward a proximal end of the shroud beyond the disc edge; and a retaining feature adjacent the shroud proximal end adapted for retaining the filter. Two or more fluid guides are stackable and fixable to the base to interlace the vanes between adjacent discs in a multi-disc stack. Methods of populating and depopulating the data storage device are possible by alternatively placing the discs and the guides.

17 Claims, 5 Drawing Sheets

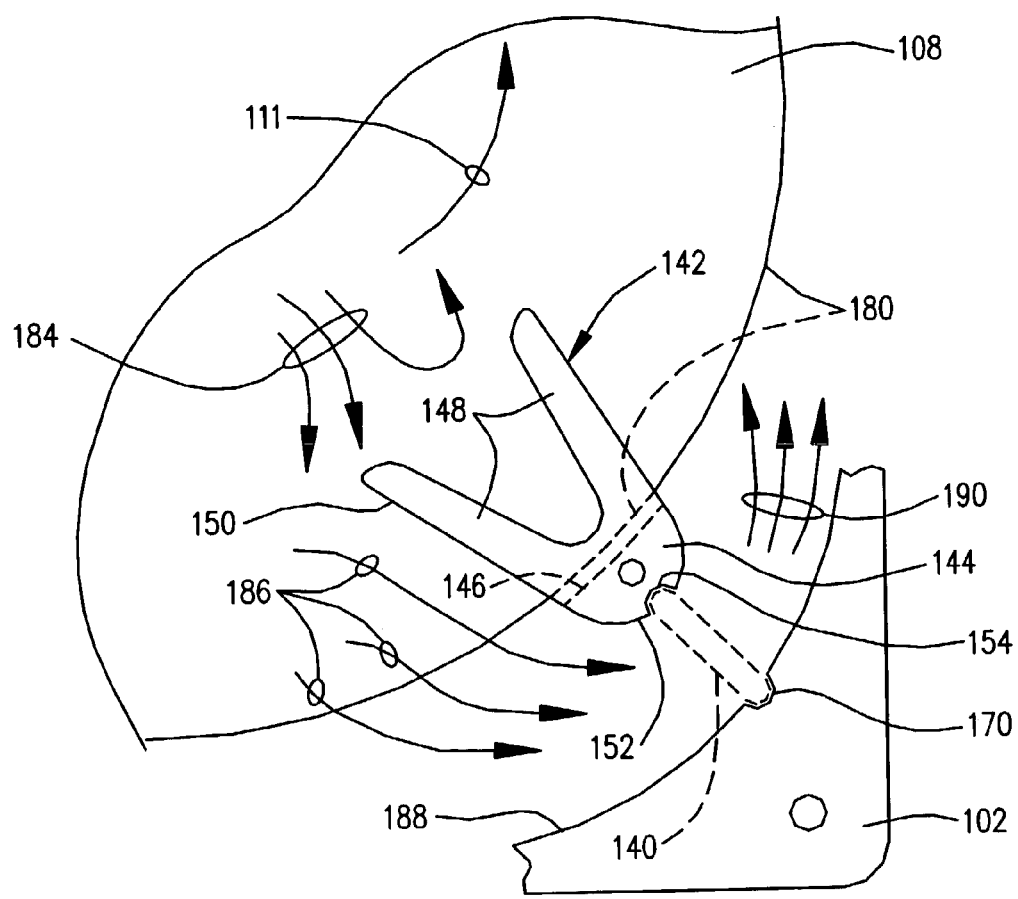
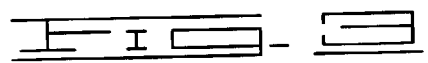
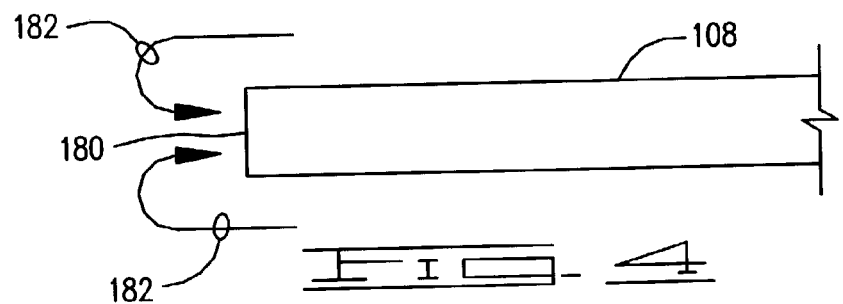
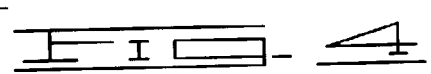
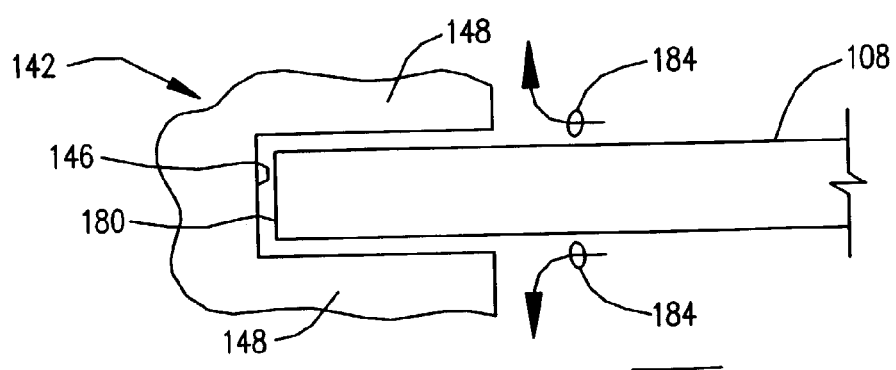
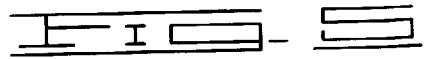

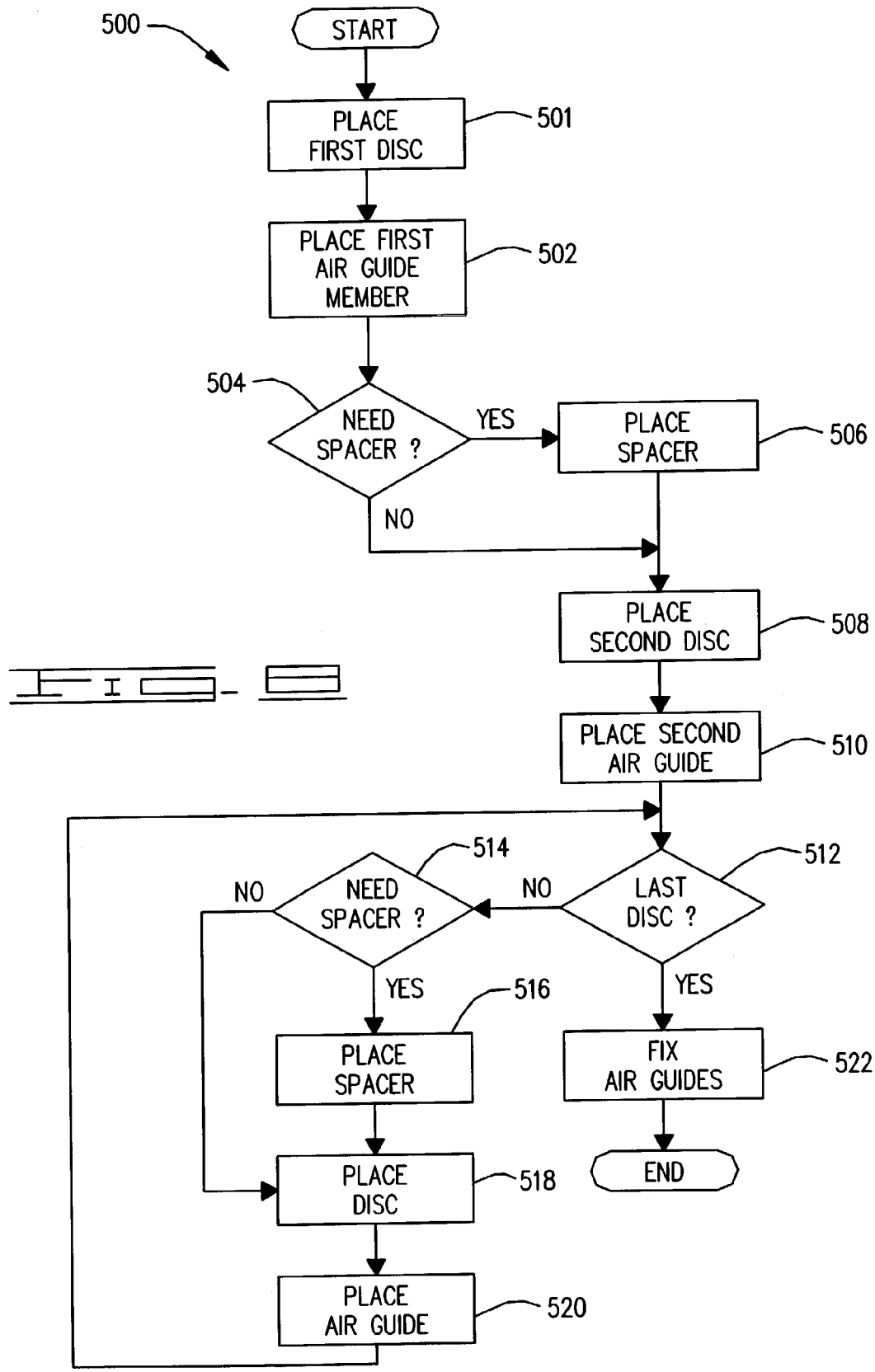

FLUID GUIDE FOR A DATA STORAGE DEVICE

CROSS REFERENCE TO RELATED APPLICATIONS

This application claims the benefit of U.S. Provisional Application No. 60/375,859 filed on Apr. 26, 2002.

FIELD OF THE INVENTION

This invention relates generally to the field of fluid flow control in a rotating media data storage device and more particularly but without limitation to a fluid guide for a recirculating filter assembly.

BACKGROUND OF THE INVENTION

Modern data storage devices are used in a multitude of computer environments to store large amounts of data in a form that is readily available to a user. Generally, a disc drive is a data storage device having one or more data storage discs forming a disc stack that is rotated by a motor at high speeds. Each disc has a data storage surface divided into a series of generally concentric data tracks where data is stored, such as in the form of magnetic flux transitions.

A data transfer member, such as a magnetic transducer, is moved by an actuator to selected positions adjacent the data storage surface to sense the magnetic flux transitions in reading data from the disc, and to transmit electrical signals to induce the magnetic flux transitions in writing data to the disc. The active elements of the data transfer member are supported by suspension structures extending from the actuator. The active elements are maintained a small distance away from the data storage surface as the data transfer member flies upon a fluid bearing generated by a fluid flow caused by the spinning discs. In some cases the fluid can be air, or alternatively it can be other fluids such as an inert gas like helium.

A continuing trend in the industry is toward ever-increasing the data storage capacity and processing speed while maintaining and even reducing the physical size of the disc drive. Consequently, continual efforts are directed to miniaturizing the data transfer member and supporting structures, while increasing data storage densities and decreasing data transfer member fly height, resulting in overall increased sensitivities to vibration and noise. At the same time, continually increasing the disc speed for faster data access time has resulted in the fluid flow becoming a more significant impact to be considered.

Many attempts have been made to harness the outwardly flowing fluid for practical good. For example, there are many solutions that channel the fluid flow toward a latching mechanism to release the actuator when the discs reach a threshold speed. Also, some solutions channel the fluid flow in a recirculation channel containing a filter for removing particulates from the fluid.

In order to direct a sufficient amount of the fluid toward a filter a pressure differential must be established. Shrouding the disc stack, for example, increases the fluid pressure at the outer edge. An opening in the shrouding therefore can provide an inlet into such a recirculation channel containing a filter. Dams have been used as well to guide the fluid flow toward the filter. It has been determined, however, that superior cleaning performance can be achieved by providing a fluid stripper member extending outwardly over the disc surface deflecting the fluid toward the disc edge where another portion of the stripper member supports the filter. Such an arrangement significantly increases the flow rate through the filter providing an improved cleaning process. It is to these improvements and others as exemplified by the description and appended claims that embodiments of the present invention are directed.

SUMMARY OF THE INVENTION

The embodiments of the present invention contemplate a fluid guide for recirculating fluid through a filter in a data storage device, the data storage device having a disc rotatably supported on a base and operatively imparting a velocity to the fluid surrounding the disc resulting in a generally outwardly spiraling fluid flow. The fluid guide comprises a shroud supportable by the base substantially transversely to the disc comprising a distal surface closely matingly engageable with the disc edge, a vane extending from the shroud substantially parallel to the disc and opposing the base, the vane comprising a leading edge disposed transverse to the disc and within the fluid flow, guiding the fluid toward a proximal end of the shroud beyond the disc edge; and a retaining feature adjacent the shroud proximal end adapted for retaining the filter.

In one aspect a fluid guide assembly is contemplated for guiding fluid toward a filter in a data storage device having a disc stack with first and second data storage discs on a base supporting a motor operatively moving the discs relative to the fluid guide assembly, the first disc having a first side adjacent the base and an opposing second side, the second disc having a first side adjacent the first disc second side and an opposing second side. The fluid guide assembly comprises a first guide attachable to the base, and comprising a shroud defining a first reference surface abuttingly engageable against the base and a second reference surface, and a vane extending laterally from the shroud interposable between the discs. The fluid guide assembly further comprises a second guide attachable to the base, and comprising a shroud defining a first reference surface abuttingly engageable against the first guide second reference surface, and a vane extending laterally from the shroud disposable adjacent the second disc opposing the base.

In one aspect of the embodiments of the present invention a method is contemplated of assembling a data storage device having two or more rotatable data storage discs in a disc stack assembly. The method comprises the steps of obtaining a base portion of the data storage device; fixing a motor comprising a rotatable hub to the base; placing a first data disc around the hub; placing a first guide on the base, the first guide comprising a vane portion operatively extending substantially radially adjacent the first data disc opposing the base; placing a second data disc around the hub spatially disposed from the first data disc; and placing a second guide on the first guide, the second guide comprising a vane portion operatively extending substantially radially adjacent the second data disc opposing the base. For a disc stack comprising three discs the method further comprises placing a third disc around the hub spatially disposed from the second disc; and placing a third guide on the second guide, the third guide comprising a vane portion operatively extending substantially radially adjacent the third data disc opposing the base. In one embodiment spacers are placed after each of the discs to obtain the desired spatial separation.

In one aspect of the embodiments of the present invention a method is contemplated of depopulating a disc stack in order to reduce the number of discs, comprising the steps of removing the third guide; removing the third disc and spacer; removing the second guide; removing the second disc and spacer; replacing the first guide with a different size guide characterized by a different size shroud and vane; replacing the first spacer with a different size spacer; replacing the second or the third disc around the hub; and placing the third guide on the different size guide.

In one aspect of the embodiments of the present invention a data storage device is contemplated comprising a base supporting a rotating disc stack in a data reading and writing relationship with a data transfer member, and means for diverting a fluid flow in the disc stack by a fluid guide characterized by the same number of guide vanes as there are discs in the disc stack, the vanes interlaced with the discs.

These and various other features as well as advantages which characterize the embodiments of the present invention will be apparent upon reading of the following detailed description and review of the associated drawings.

BRIEF DESCRIPTION OF THE DRAWINGS

FIG. 3 is an enlarged detail of a portion of the plan view of FIG. 1.

FIG. 4 is a diagrammatic view of the coupling effects of fluid currents acting on the disc edge.

FIG. 5 is a diagrammatic view illustrating the vanes deflecting the fluid currents away from the disc edge.

FIG. 9 is a cross section view of the disc stack of FIG. 7 after being depopulated from three discs to two discs.

DETAILED DESCRIPTION

Figure 1:
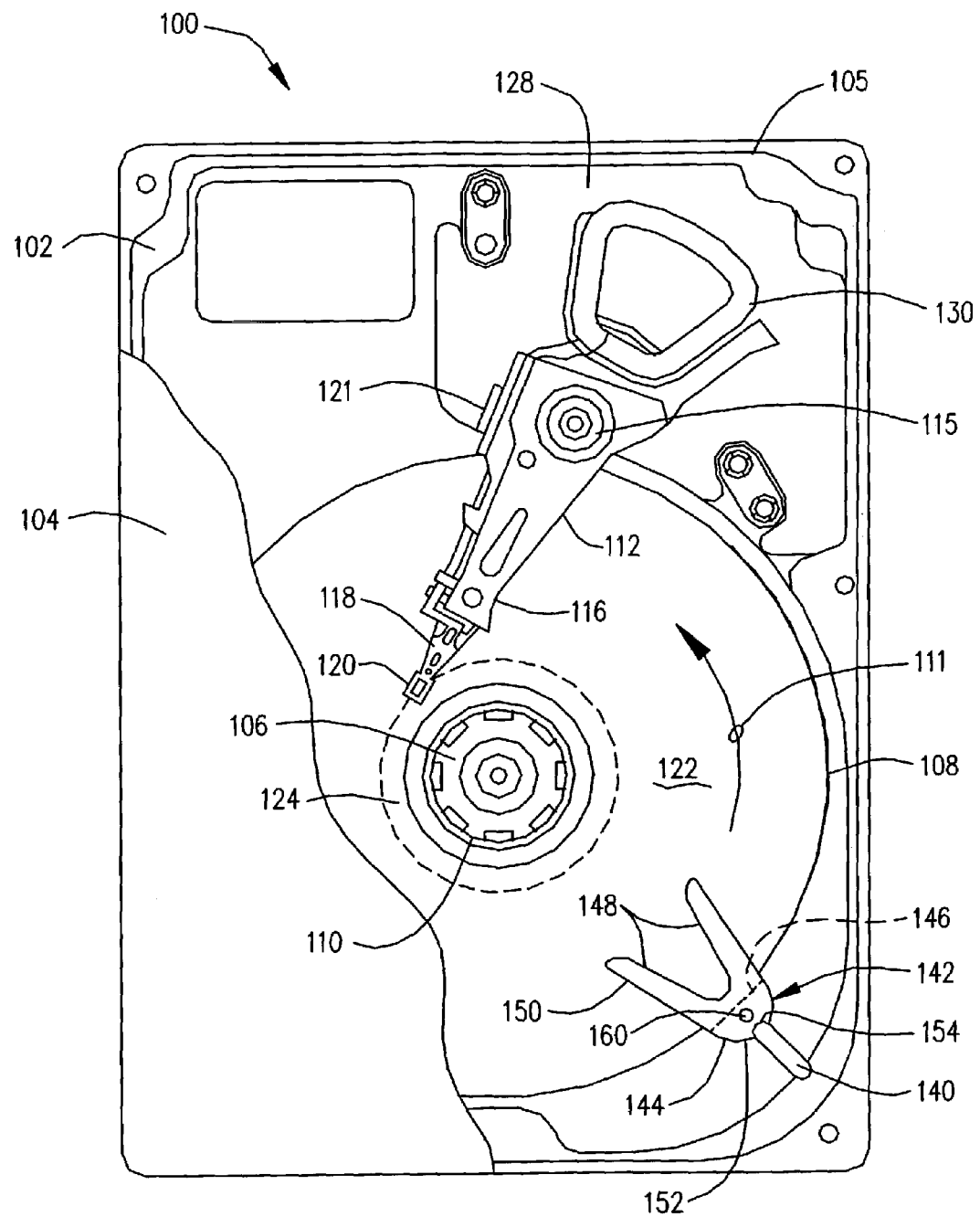
FIG. 1 is a plan view of a rotating media data storage device constructed in accordance with embodiments of the present invention.

Referring to the drawings in general, and more particularly to FIG. 1, shown therein is a plan representation of a data storage disc drive 100 constructed in accordance with an embodiment of the present invention. The disc drive 100 includes a base 102 to which various components are mounted, and a cover 104 (partially cut-away) which together with the base 102 and a perimeter gasket 105 forms an enclosure providing a sealed internal environment for the disc drive 100.

Mounted to the base 102 is a motor 106 to which one or more data storage discs 108 are stacked and secured by a clamp ring 110 for rotation at a high speed in direction 111. A plurality of discs 108 can be stacked with alternating disc spacers (shown below) to form a disc stack (shown below). An actuator 112 pivots around a pivot bearing 115 in a plane parallel to the discs 108. The actuator 112 has actuator arms 116 (only one shown in FIG. 1) that support load arms 118 in travel across the discs 108 as the actuator arms 116 move within the spaces between adjacent discs 108. The load arms 118 (or "flexures") are flex members that support data transfer members, such as read/write heads 120 ("heads"), with each of the heads 120 operatively interfacing one of the discs 108 in a data reading and writing relationship. Data read and write signals are transmitted from the head 120 to a preamplifier 121 by electrical traces (not shown) extending along the actuator 112.

Each of the discs 108 has a data storage region comprising a data storage surface 122 divided into concentric circular data tracks (not shown). Each of the heads 120 are positioned adjacent a desired data track to read data from or write data to the data track. A circular landing zone 124 is provided where the heads 120 can come to rest against the respective discs 108 at times when the discs 108 are not spinning. The landing zone 124 can bound the data storage surface 122 inwardly; alternatively, the landing zone 124 can be located elsewhere.

The actuator 112 is positioned by a voice coil motor (VCM) 128 comprising an electrical coil 130 and a magnetic circuit source. The magnetic circuit source comprises one or more magnets supported by magnetic poles to complete the magnetic circuit. When controlled current is passed through the actuator coil 130, an electromagnetic field is set up which interacts with the magnetic circuit, causing the actuator coil 130 to move. As the actuator coil 130 moves, the actuator 112 pivots around the pivot bearing 115, causing the heads 120 to travel across the discs 108 within an operable range of movement.

The motor 106 spins the discs 108 at a high speed as the head 120 reads data from and writes data to the data storage surface 122. The kinetic energy of the spinning discs 108 transfers through the boundary layer at the disc/surrounding fluid interface, thereby inducing a rotational force component to a fluid flow, while centrifugal force imparts a radial force component to the fluid flow, creating a generally outwardly spiraling flow. The head 120 includes an aerodynamic slider portion (not shown), which engages the fluid flow to fly the head 120 away from the data storage surface 122 during data reading and writing operations.

The fluid within the enclosure upon which the head 120 flies can be air; alternatively, the fluid can be another fluid such as an inert gas like helium.

As the disc rotates, the outwardly flowing fluid produces pressure gradients within the disc stack. Generally, the pressure is relatively greater at the outer radius of the disc 108 and progressively lower toward the inner radius of the disc. The embodiments of the present invention harness this pressure gradient in order to effectively guide the fluid flow toward a recirculation circuit. In this recirculation circuit a filter 140 traps any fluid borne particulates in the recirculating fluid.

A fluid guide 142 ("guide" 142) constructed in accordance with embodiments of the present invention is shown in FIG. 1. The guide 142 comprises a shroud 144 portion that is operatively supported by the base 102 and disposed substantially transversely to the disc 108. The shroud 144 comprises a distal surface 146 that is operatively closely matingly engaged with the disc edge. The guide 142 further comprises a vane 148 portion extending from the shroud 144 and disposed substantially parallel to the disc 108 and opposing the base 102. The vane comprises a leading edge 150 disposed transverse to the disc 108 and within the fluid flow, thereby guiding the fluid toward a proximal end 152 of the shroud 144 beyond the disc edge. The guide 142 further comprises a retaining feature 154 adjacent the shroud proximal end 152 adapted for retaining the filter 140.

Figure 2:
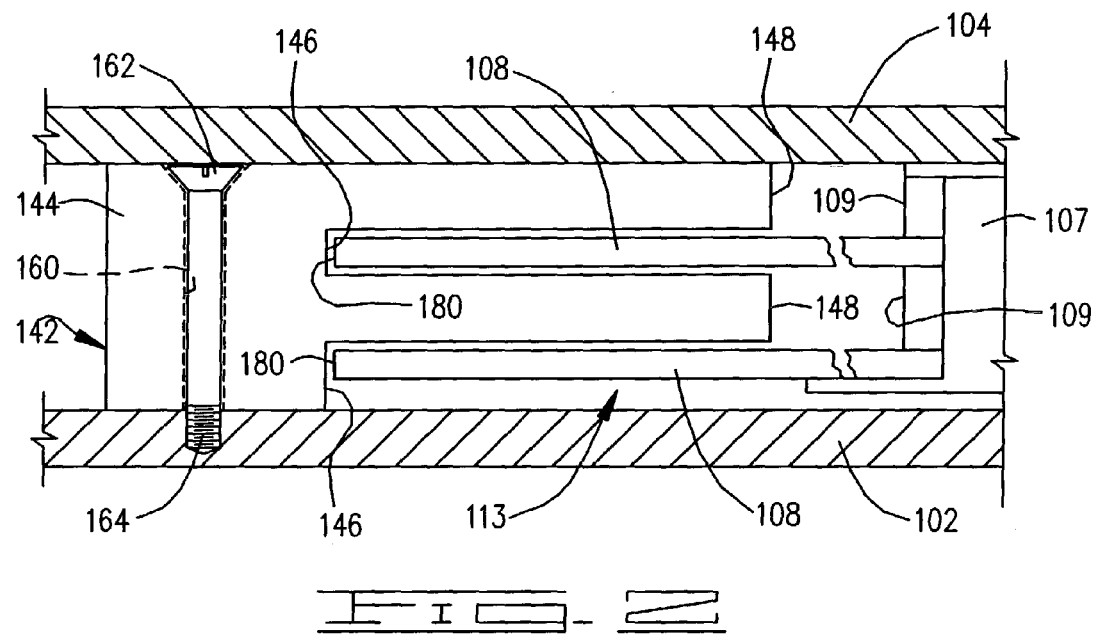
FIG. 2 is a cross sectional view of an fluid guide constructed in accordance with the embodiments of the present invention.

FIG. 2 illustrates a data storage device comprising a disc stack 113 having two discs 108. The embodiments of the present invention contemplate the guide 142 comprising a vane 148 extending from the shroud 144 adjacent each of the discs 108 and opposing the base 102.

The shroud 144 can define a longitudinal opening 160 adapted for passing a fastener 162 having a distal end 164 that is engageable with the base 102. In FIG. 2, for example, the distal end 164 threadingly engages a portion of the base 102. The opposing end of the opening 160 can be recessed, such as the tapered opening in FIG. 2, to receive the fastener head for a flush mounting of the cover 104 against the adjacent vane 148.

FIG. 3 is an enlarged detail of a portion of FIG. 1. By defining the retaining feature 154 in the shroud 144 as a longitudinally extending slot, a first end of the filter 140 can be receivingly engaged and retained therein. By providing an opposing retaining feature 170, such a similar longitudinal slot, in the base 102, the other end of the filter 140 can be receivingly engaged and retained therein. These opposing retaining features 154, 170 make possible a relatively simple filter 140 installation process without the need for fasteners. Such a process is particularly well suited for automation.

As described above, the distal surfaces 146 of the shroud 144 are operatively disposed in a close mating engagement with the disc edge 180. That is, preferably the distal surface 146 matches the radius of the disc edge 180. This shrouding of the disc edge 180 prevents the otherwise present coupling effects of the fluid currents (denoted 182) flowing past the disc edge 180, as illustrated diagrammatically in FIG. 4. Rather, the vanes 148 deflect the fluid currents away from the disc edge 180 as denoted by fluid currents 184 in FIG. 5.

As best shown in FIG. 3, the leading edge 150 of the vane 148 similarly deflects the outwardly flowing fluid currents toward the distal end 152 of the shroud 144, as denoted by fluid currents 186. An opposing arcuate surface 188 of the base 102 cooperates with the guide 142 to define a fluid recirculation channel, guiding the fluid currents 186 toward the filter 140 that is supported within the channel. The fluid currents pass through the filter 140 and any fluid borne particulates are filtered out. The fluid currents (denoted by 190) then return to the disc stack 113 on the downstream side of the guide 142.

The guide 142 in FIG. 2 illustrates the manner in which the vanes 148 are operatively interlaced around the two or more discs 108 in a disc stack. Installing a guide 142 in such an arrangement can be problematic because there typically is not enough clearance beyond the disc edge 180 to marry the guide 142 with the discs 108 after the disc stack 113 is installed to the base 102. Accordingly, the guide 142 must be married with the disc stack 113 and the two installed to the base 102 in unison. Such an arrangement also makes depopulating a disc stack impossible without first removing the entire disc stack 113 and guide 142 in unison.

Figure 6:
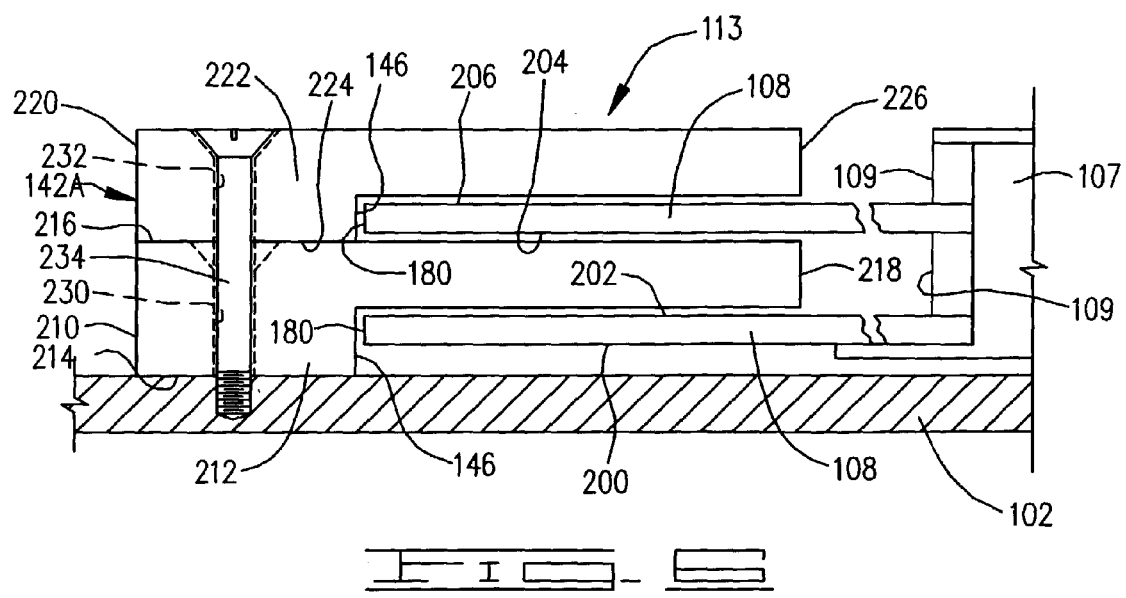
FIG. 6 is cross sectional view of a fluid guide assembly comprising a pair of stacked guides and constructed in accordance with embodiments of the present invention.

FIG. 6 shows a segmented fluid guide assembly 142A constructed in accordance with alternative embodiments of the present invention. The disc stack 113 comprises first and second data storage discs 108. The first disc 108 has a first side 200 adjacent the base 102 and an opposing second side 202. The second disc 108 has a first side 204 adjacent the first disc second side 202 and an opposing second side 206.

The fluid guide assembly 142A comprises a first guide 210 attachable to the base 102 comprising a shroud 212 defining a first reference surface 214 abuttingly engageable against the base 102 and a second reference surface 216. A vane 218 extends laterally from the shroud 212 and is interposable between the discs 108.

The fluid guide assembly 142A further comprises a second guide 220 attachable to the base 102 comprising a shroud 222 defining a first reference surface 224 abuttingly engageable against the first guide second reference surface 216. A vane 226 extends laterally from the shroud 222 and is disposable adjacent the second disc 108 opposing the base 102.

As above, the shrouds 212, 222 define respective arcuate surfaces 146 operatively in a substantially close mating relationship with the edge 180 of the respective disc 108. Also, the vanes 218, 226 comprise leading edges 150 (see FIG. 3) disposed transverse to the disc 108 and within the fluid flow, guiding the fluid toward the proximal end 152 of the shrouds 212, 222 beyond the disc edge 180. Also, as above, the shrouds 212, 222 comprise a retaining feature 154 adjacent the shroud proximal end 152 adapted for retaining the filter 140; for example, the retaining feature 154 comprising the slot adapted for sliding engagement with the filter. In this embodiment, however, each of the shrouds 212, 222 define a portion of the slot that is operatively alignable to cooperatively receivingly engage the filter 140.

The shrouds 212, 222 further define longitudinal openings 230, 232 that are operatively alignable defining a passage for a fastener 234 that is engageable with the base 102, thereby attaching the fluid guide 142A to the base 102.

Although not shown, it can be advantageous to define locating features in mating parts to retain the operative position of the parts while securing the fastener 234. For example, in FIG. 6 a detent can be formed in the base 102 to align with a protrusion extending from the first reference surface 214 in the operative position of the first guide 210. With the protrusion receivingly engaged in the detent, the first guide 210 is positively fixed with respect to its rotational orientation.

The fluid guide assembly 142A permits a method of assembling a data storage device 100 having two or more rotatable data storage discs 108 in a disc stack assembly, in accordance with embodiments of the present invention. The method comprises the steps of obtaining the base portion 102 of the data storage device 100; fixing a motor 106 comprising a rotatable hub 107 to the base 102; placing a first data disc 108 around the hub 107; placing a first guide 210 on the base 102, the first guide 102 comprising a vane portion 218 operatively extending substantially radially adjacent the first data disc 108 and opposing the base 102. The method further comprises placing a second data disc 108 around the hub 107 spatially disposed from the first data disc 108; and placing the second guide 220 on the first guide 210, the second guide 220 comprising a vane portion 226 operatively extending substantially radially adjacent the second data disc 108 opposing the base 102.

The method can comprise a placing the fluid guides step comprising providing guides 210, 220 characteristically defining an arcuate surface 146 operatively disposed in a substantially close mating relationship with an edge 180 of the respective disc 108.

The method can comprise a placing the fluid guides step comprising providing guides 210, 220 characteristically defining a leading edge 150 (FIG. 3) disposed transverse to the disc 108 and within the fluid flow guiding the fluid toward the proximal end 152 of the shroud 212, 222 beyond the disc edge 180.

The method can further comprise inserting a portion of the filter 140 edgewise into the retaining feature 154 of the guides 210, 220, thereby operatively retaining the filter 140. Furthermore, the method can comprise fixing the guides 210, 220 to the base 102, such as by threadingly engaging the fastener 234 with the base 102. The method can further comprise placing a spacer 109 around the hub 107 after each of the discs 108 is placed around the hub 107, in order to spatially dispose the discs 108.

Figure 7:
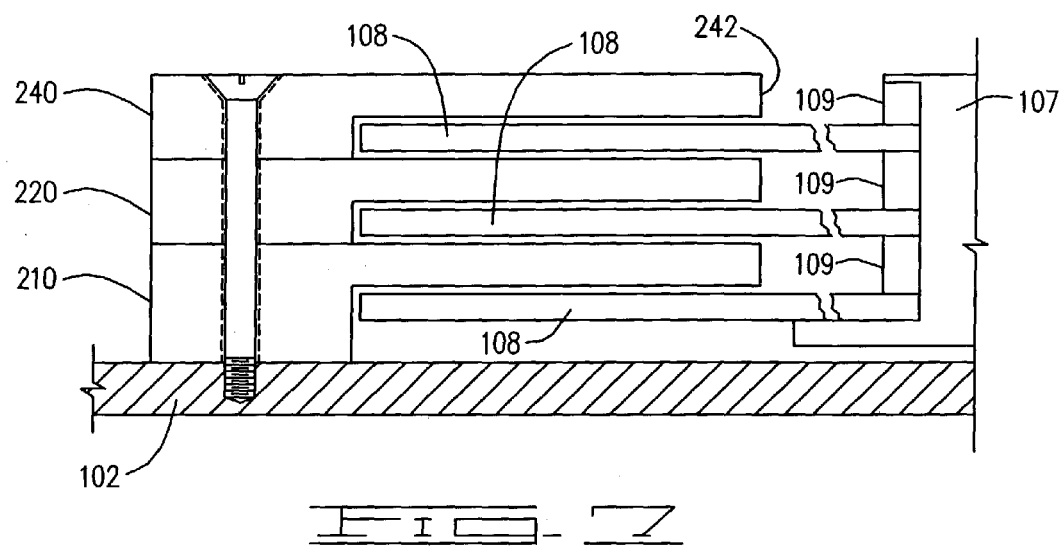
FIG. 7 is a cross section view similar to FIG. 6 but for a three-disc stack.

FIG. 7 illustrates, for a three-disc stack, the method can further comprise placing a third disc 108 and spacer around the hub 107, and placing a third guide 240 on the second guide 220, the third guide 240 comprising a vane portion 242 operatively extending substantially radially adjacent the third data disc 108 opposing the base 102.

Figure 8:
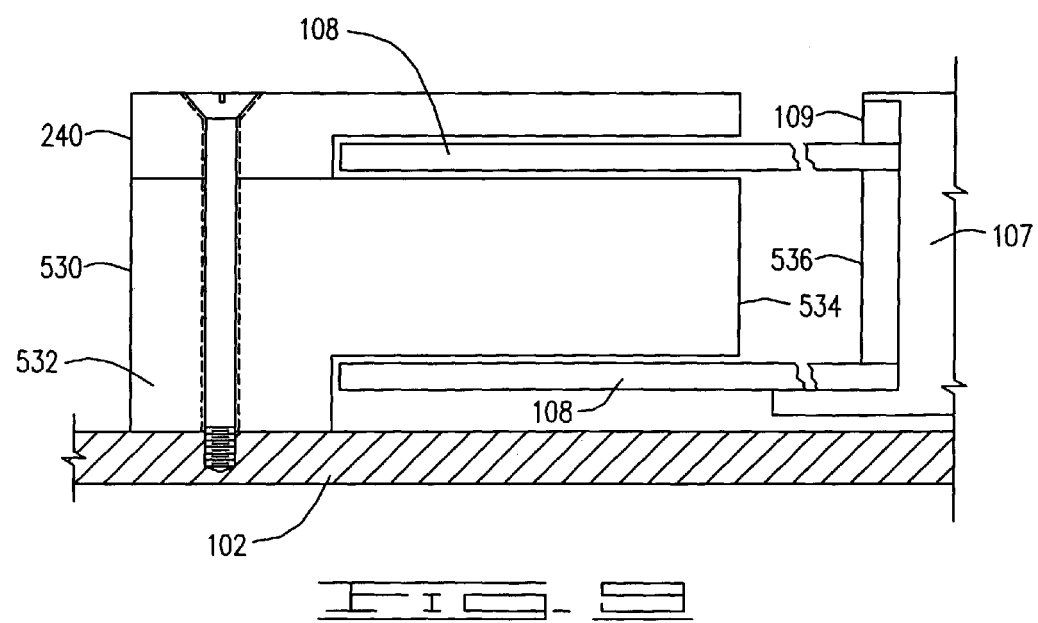
FIG. 8 is a block diagram of a method of assembling the data storage device of FIG. 1 in accordance with embodiments of the present invention.

FIG. 8 is a block diagram of this method 500 of interlacing the segmented guides 210, 220, 240 with the discs 108 while building the disc stack 113 comprising two or more discs. The method begins at block 501 wherein the first disc is placed around the motor hub. At block 502 the first guide is placed on the base. Control then passes to decision block 504 to determine whether a spacer is needed. In some cases a spacer is not needed because the disc might comprise a unitary spacer portion. If a spacer is needed, one will be placed around the hub in block 506.

The second disc is placed around the hub at block 508, followed by the second guide being placed against the first guide at block 510. Control then passes to decision block 512 to determine whether additional discs are needed. If so, then the decision as to whether a spacer is needed occurs at block 514, followed by placing a spacer, if needed, and a disc at blocks 516, 518, respectively. Another guide is then placed at block 520, and then control returns to block 512 to determine whether another disc is needed to complete the disc stack. If the last disc has been added, control passes to block 522 where the guides are fixed to the disc drive enclosure, and the process is ended.

This method of alternatively placing the discs 108 with guides 210, 220, 240 to achieve an interlaced relationship can be worked in reverse in order to depopulate a disc stack. For example, FIG. 9 illustrates the disc stack arrangement of FIG. 7 after being depopulated to remove the middle disc 108. The following procedure illustrates a method associated with the embodiments of the present invention for depopulating a disc stack: removing the third guide 240; removing the third disc 108 and spacer 109; removing the second guide 220; removing the second disc 108 and spacer 109; replacing the first guide 210 with a different size guide 530 characterized by a different size shroud 532 and vane 534; and placing a different size spacer 536 around the hub 107; placing the third disc 108 and spacer 109 around the hub 107; and replacing the third guide 240 on the replacement guide 530.

In summary, the embodiments of the present invention contemplate a data storage device (such as 100) comprising a base (such as 102) supporting a rotating disc stack (such as 113) in a data reading and writing relationship with a data transfer member (such as 120), and means for diverting a fluid flow (such as 186) in the disc stack by a fluid guide (such as 142) characterized by the same number of guide vanes (such as 148) as there are discs (such as 108) in the disc stack, the vanes being interlaced with the discs.

In one embodiment the fluid guide comprises a fluid guide assembly of a plurality of guides (such as 210, 220). The guides comprise a shroud portion (such as 212, 222) defining reference surfaces (such as 214, 216, 224) permitting positive placement of the guides and attachment thereof to a base (such as 102) of the disc drive enclosure, such as by the use of a fastener (such as 234).

The segmented guides permit a method of building a disc stack and fluid guide by alternatively placing the discs and guides and then fixing the stacked guides to the base (such as 500). Also, the segmented guides permit a method of depopulating a disc stack within a disc drive by alternatively removing the guides and discs, and then replacing a different size guide and spacer to span the space of a removed disc in the depopulated disc stack.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, general size and shape of the guide shroud and/or vane portion may vary while maintaining substantially the same functionality without departing from the scope and spirit of the present invention. In addition, although the preferred embodiment described herein is directed to use in a data storage device, it will be appreciated by those skilled in the art that the teachings of the present invention can be applied to other types of work pieces as well without departing from the scope and spirit of the present invention.

What is claimed is:

1. A fluid guide for recirculating fluid through a filter in a data storage device, the data storage device having a disc rotatably supported on a base and operatively imparting a velocity to the fluid surrounding the disc resulting in a generally outwardly spiraling fluid flow, the fluid guide comprising:
   a shroud supportable by the base substantially transversely to the disc comprising a distal surface closely matingly engageable with the disc edge;
   a vane extending from the shroud substantially parallel to the disc and opposing the base, the vane comprising a leading edge disposed transverse to the disc and within the fluid flow, guiding the fluid toward a proximal end of the shroud beyond the disc edge; and
   a retaining feature adjacent the shroud proximal end adapted for retaining the filter.

2. The fluid guide of claim 1 wherein the data storage device comprises a disc stack having two or more discs, the fluid guide comprising a vane extending from the shroud adjacent each of the discs and opposing the base.

3. The fluid guide of claim 1 wherein the shroud defines a longitudinal opening adapted for passing a fastener having a distal end engageable with the base.

4. The fluid guide of claim 1 wherein the retaining feature comprises a slot adapted for sliding engagement with the filter.

5. The fluid guide of claim 4 wherein the base comprises an opposing slot adapted for sliding engagement with another portion of the filter.

6. A fluid guide assembly for guiding fluid in a data storage device having first and second data storage discs on a base supporting a motor operatively moving the discs relative to the fluid guide assembly, the first disc having a first side adjacent the base and an opposing second side, the second disc having a first side adjacent the first disc second side and an opposing second side, the fluid guide assembly comprising:
   a first guide attachable to the base comprising:
       a first shroud defining a first reference surface abuttingly engageable against the base and a second reference surface;

a second vane extending laterally from the first shroud interposable between the discs; and a second guide attachable to the base comprising:
  a second shroud defining a first reference surface abuttingly engageable against the first guide second reference surface; and
  a second vane extending laterally from the second shroud disposable adjacent the second disc opposing the base.

7. The fluid guide assembly of claim 6 wherein the shrouds define respective arcuate surfaces operatively in a substantially close mating relationship with an edge the respective disc.

8. The fluid guide assembly of claim 6 wherein the vanes each comprise a leading edge disposed transverse to the disc and within the fluid flow, guiding the fluid toward proximal ends of the shirouds beyond the disc edge.

9. The fluid guide assembly of claim 6 wherein the shrouds each comprise a retaining feature adjacent a proximal end of the respective shroud adapted for retaining a filter.

10. The fluid guide assembly of claim 9 wherein each retaining feature comprises a slot adapted for sliding engagement with the filter.

11. The fluid guide assembly of claim 10 wherein the base comprises an opposing slot adapted for sliding engagement with another portion of the filter.

12. The fluid guide assembly of claim 6 wherein the shrouds define longitudinal openings that are operatively alignable defining a passage for a fastener engageable with the base.

13. An apparatus comprising:
a base;
a member mounted to the base and rotatable about an axis, the rotatable member being configured to operatively impart a velocity to the fluid surrounding the rotatable member, resulting in a generally outwardly spiraling fluid flow;
a filter for removing particulant matter from the fluid; and
a fluid guide for recirculating fluid through the filter, the fluid guide comprising:
  a shroud supported by the base and oriented substantially parallel to the axis, the shroud comprising a distal surface closely matingly engageable with an edge of the rotatable member;
  a vane extending from the shroud substantially parallel to the axis, the vane comprising a leading edge disposed parallel to the axis and within the fluid flow, guiding the fluid toward a proximal end of the shroud beyond the edge of the rotatable member; and
  a retaining feature adjacent the shroud proximal end adapted for retaining the filter.

14. The apparatus of claim 13, in which the apparatus comprises a data storage device.

15. The apparatus of claim 14, in which the rotatable member comprises a disc.

16. The apparatus of claim 15, in which the disc is magnetic.

17. The apparatus of claim 13, in which the rotatable member comprises a disc.

* * * * *